(12) United States Patent
Sund (10) Patent No.: US 10,113,416 B2
(45) Date of Patent: Oct. 30, 2018

(54) MODELLING TOOL (71) Applicant: ENERGY DYNAMICS AS,Ræge (NO)

(72) Inventor: Knut Arne Sund,Ræge (NO)

(73) Assignee: ENERGY DYNAMICS AS,Ræge (NO)

( * ) Notice: Subject to any disclaimer, the term of this patent is extended or adjusted under 35 U.S.C. 154(b) by 0 days.

(21) Appl. No.: 15/106,122

(22) PCT Filed: Dec. 19, 2014

(86) PCT No.: PCT/NO2014/050248
§ 371 (c)(1),
(2) Date: Jun. 17, 2016

(87) PCT Pub. No.: WO2015/093979
PCT Pub. Date: Jun. 25, 2015

(65) Prior Publication Data
US 2017/0002649 A1    Jan. 5, 2017

(30) Foreign Application Priority Data
Dec. 19, 2013 (NO) ................................. 20131711

(51) Int. Cl.
*G01V 3/00* (2006.01)
*E21B 47/12* (2012.01)
(Continued)

(52) U.S. Cl.
CPC ....... *E21B 47/12* (2013.01); *G06Q 10/06313* (2013.01); *G06Q 10/10* (2013.01); *H04L 67/10* (2013.01)

(58) Field of Classification Search
CPC .... E21B 47/12; G06Q 10/06313; H04L 67/10
(Continued)

(56) References Cited

U.S. PATENT DOCUMENTS

2004/0256152 A1    12/2004 Dashevskiy et al.
2005/0211468 A1*    9/2005 Veeningen ................ E21B 7/04
                                                                175/24
(Continued)

FOREIGN PATENT DOCUMENTS

WO        2013/074095 A1    5/2013

OTHER PUBLICATIONS

International Search Report issued in PCT/NO2014/050248 dated May 7, 2015 (2 pages).
(Continued)

*Primary Examiner* — Dhaval Patel
(74) *Attorney, Agent, or Firm* — Osha Liang LLP (57) ABSTRACT

A communication and data processing system for use between one or more employers and one or more service providers, at least including a mathematical model for calculating a quantity $H_f(T)$, where $H_f(T)$ denotes a size of a fee to the one or more service providers and T denotes the true time use. Calculating $H_f(T)$ at least includes using the following manipulated parameters: $T_N$, estimated time for completing the project; T, actual time for completing the project; Z, chosen portion of total project value; and at least one parameter indicative of real-time data for the project. The communication and data processing system is implemented as an application on a computer, the application acquiring real-time data automatically at predetermined times and other parameters being entered manually via a user interface.

16 Claims, 5 Drawing Sheets

(51) Int. Cl.
*G06Q 10/10* (2012.01)
*G06Q 10/06* (2012.01)
*H04L 29/08* (2006.01)

(58) Field of Classification Search
USPC ......... 340/853.1, 853.2, 853.6, 855.4, 855.7;
705/7.11, 7.12, 7.22; 175/24, 26;
707/741
See application file for complete search history.

(56) References Cited

U.S. PATENT DOCUMENTS

2006/0047527 A1 3/2006 Caveny et al.
2009/0234584 A1 9/2009 Casey et al.
2015/0293259 A1* 10/2015 Rojas .................. E21B 44/00
702/6
2016/0275133 A1* 9/2016 Moore .................. E21B 47/00
2016/0281490 A1* 9/2016 Samuel ................ E21B 44/00

OTHER PUBLICATIONS

Written Opinion of the International Searching Authority issued in PCT/NO2014/050248 dated May 7, 2015 (6 pages).
Norwegian Search Report issued in Patent Application No. 20131711 dated Jul. 15, 2014 (2 pages).

* cited by examiner

Fig. 10 ered parameters, and oil operations related data between a hub and nodes, wherein the data is used as manipulated parameters of a mathematical model on a WITSML server and the output function is used for increasing plant time efficiency.

MODELLING TOOL

FIELD OF THE INVENTION

The present invention relates to a communication system and a method for using the communication system to improve the processing of measurement data, operational parameters, and oil operations related data between a hub and nodes, wherein the data is used as manipulated parameters of a mathematical model on a WITSML server and the output function is used for increasing plant time efficiency.

BACKGROUND ART

Enormous amounts of data are transported from a wellbore to a rig and from the rig to operators and other users. The data provides information, inter alia, on the progression of well drilling, on formations, resistivity, etc. Such information is useful for the operations.

The efficient communication of measurement data, operational parameters, and oil operations related data, as well as the processing thereof, may be of importance for plant time—such as drilling time, for example.

Historically, various efforts have been made for improving the communication of data between a rig and operation centres and between operators. XML based platforms have been introduced for exchanging data. Between operators, commonly WITSML (Wellsite Information Transfer Standard Markup Language) is used, whereas from an oil rig, in the case of petroleum data, typically PRODML (PRODuction ML) is used. These are standards developed for the transferral of data by way of open Internet standards.

As indicated, it is essential that as much as possible relevant data such as wellbore data can be transferred to operators and service providers, and not the least that this data is used for ensuring a proper execution of drilling projects.

SUMMARY OF THE INVENTION

A communication and data processing system and a method for using the communication system to improve the processing of measurement data, operational parameters, and oil operations related data between a hub and nodes, wherein the data is used as manipulated parameters of a mathematical model on a WITSML server and the output function is used for increasing the plant time efficiency.

One or more embodiments of the present invention provide a communication and data processing system and a method for using the communication and data processing system to improve the processing of measurement data, operational parameters, and oil operation related data between a hub and nodes, wherein the data is used as manipulated parameters of a mathematical model on a WITSML server and the output function from the mathematical model is used for increasing the plant time efficiency.

More particularly, according to one or more embodiments of the invention, a communication and data processing system is provided for use between one or more system users and one or more system suppliers of the communication and data processing system, at least comprising:

One or more downhole transmitters configured for providing LWD and/or MWD data.

The downhole transmitters communicating via a communication line with one or more computers upstream of the communication line through a data protocol for the transfer of LWD and/or MWD data.

LWD and/or MWD data being stored locally at the one or more upstream computers.

Data being transferred locally from the drilling installation to a central hub, the transfer being accomplished by wire or wirelessly via radio transceivers located on the installation and communicating with the central hub.

The central hub comprising a WITSML server

One or more mathematical models at the WITSML server for calculating one or more output functions $H_i(T)$, where $H_i(T)$ denotes a function for increasing the plant time efficiency and T denotes the true time consumption in a project, and calculating $H_i(T)$ at least comprises using the following manipulated parameters: $T_N$: estimated time for completing the project, T: actual time for completing the project, Z: chosen percentage of total project value, and at least one parameter obtained from the one or more downhole transmitters, Wherein, further, an application is implemented at the central hub, the application being configured for receiving parameters from the downhole transmitters including LWD and/or MWD data and other parameters relevant for the project, and the application being in direct communication with the mathematical model, or the application comprising the mathematical model, One or more first computers having direct access to the hub and WITSML server, which is operated by said one or more system suppliers, One or more second computers in communication with the one or more first computers, the second computers at least receiving output functions Hi(T) from the one or more first computers and the output functions Hi(T) being selectively associated with individual second computers, and Wherein one or more system users are associated with the second computers.

It is to be understood that the system users comprise several subgroups of users of the communication and data processing system according to the present invention, which subgroups may comprise at least employers and service providers in a project, and the system supplier is the owner of/operationally responsible for the communication and data processing system according to one or more embodiments of the present invention.

The project value Z mentioned above denotes the total value of a project for which the communication and data processing system for use between one or more system users according to one or more embodiments of the present invention are used.

According to one or more embodiments of the invention, the actual project time T is derived from real-time or substantially real-time well data, which well data may be based on LWD and/or MWD measurements.

According to one or more embodiments of the invention in which calculating $H_i(T)$ additionally at least comprises using the following manipulated parameters:

B: rate of external disturbances,

C: variable time bonus of the one or more system users >0, takes effect if $T<T_N$, D: intensity of incentive, E: impact of the one or more system users on the real value of Z when not directly involved F: external disturbances/impact on the efforts of the system users affecting the real value of Z, G: observable impact of the one or more system users on the real value of Z, I: weighting of G, J: risk parameter taking effect if $T>T_N$, K: scales J, for $T>T_N$, with K being correlated with the slope of $H_i$, and L: scales C, for $T<T_N$, with L being correlated with the slope of $H_i$ According to one or more embodiments of the communication and data processing system, the estimated project time $T_N$ is a quantity set by the system users.

According to one or more embodiments of the communication and data processing system, the manipulated parameters D, E, B, F, G, I, L, K are quantities specified by the system users.

According to one or more embodiments of the present invention, a method for controlling drilling projects is also provided, at least comprising the steps of:

a) step a comprises three separate sub-steps 1.0, 5.0, and 6.0; wherein 1.0 at least comprises defining first input parameters consisting of estimated drilling time $T_N$; 5.0 at least comprises establishing a parameter Z, with Z being a chosen percentage of the total project value; and 6.0 at least comprises acquiring real-time data representing measurement of progress of the drilling project in real-time (6.0), comprising the steps of Configuring one or more downhole transmitters for providing LWD and/or MWD data Communicating through a data protocol for transferring LWD and/or MWD data via a communication line with one or more computers upstream of the communication line, the downhole transmitters being located downstream of the communication line.

Storing LWD and/or MWD data locally at the one or more upstream computers.

Transferring data locally from the drilling installation to a central hub, the transfer being accomplished by wire or wirelessly via radio transceivers located at the installation and being in communication with the central hub.

b) are the one or more first input parameters OK? if yes, proceed to step c) (1.1); if no, proceed to step e (1.1), c) manually controlling the first input parameters (2.0), d) are the first input parameters OK? if no, proceed to step c), if yes, proceed to step e) (2.1), e) calibrating the first input parameters relative to historical data (3.0), f) is parameter value Z OK? if no, proceed to step a) (5.0), g) are the parameter values for real-time data representing measurement of progress of the drilling project in real-time OK? if no, proceed to step a) and perform sub-step 6.0, h) running the mathematical model (7.0), i) are the output functions from the mathematical model OK? if yes, proceed to step k), j) entering the output functions from the mathematical model into a sensitivity analysis model (4.0), entering the manipulated parameters from the sensitivity analysis into the mathematical model of h), proceeding to step a) and recalibrating Z (7.1), k) presenting results after the mathematical model (8.0) has been run for a plurality of system users.

Steps b to k are carried out by an application on a computer communicating with a hub including a WITSML server.

One or more embodiments of the present invention also comprises a computer readable medium comprising software for carrying out the method of the present invention.

Additional features and advantages of one or more embodiments of the present invention will be apparent from the accompanying claims.

BRIEF DESCRIPTION OF THE DRAWINGS

The following description is accompanied by drawings to facilitate the understanding of the invention, in which.

DETAILED DESCRIPTION OF THE INVENTION

In the following, various embodiments of the present invention will be described with reference to the accompanying drawings.

The present invention relates to a communication and data processing system for executing projects in which at least two system users participate in the project. In the following description, the system user responsible for the project execution is referred to as the employer. It is to be understood that this system user may include several actors, so that an employer may in fact be a group of employers. Correspondingly, the invited system user given the assignment, the contractor, is referred to as the service provider in the following. It is to be understood that a service provider may include several service providers.

Service providers and employers are both users of a communication and data processing system according to the present invention. Collectively, the users of the communication and data processing system are referred to as system users. Similarly, the supplier of and/or operationally responsible for the communication and data processing system according to the present invention is referred to as the system supplier.

Where real-time data or parameters are referred to as being "real-time" in the following, the term real-time shall be understood to include substantially real-time. Typically, acquired data or parameters need to be processed and quality assured before they can be used, so such data or parameters will be subject to a delay in comparison to true real-time data or parameters.

In its most basic form, the present invention provides a communication system and data processing system, where the purpose of the communication system is to communicate data between nodes, computers, and transmitters of the system, whereas the data processing system comprises a mathematical model that responds to manipulated parameters by producing one or more output functions. The output functions serve as a foundation for increasing the efficiency of a project. That is, the communication system and data processing system have the technical effect that projects are executed quicker or more efficiently. The manipulated parameters are parameters that affect the progress of a project.

The present invention also comprises a method for using the communication and data processing system. The method includes a number of iteration steps for processing parameters entered into a mathematical model. It is important that the parameters entered reflect the reality as best as possible, so that the output function of the mathematical model is useful for increasing the efficiency of projects. As mentioned, the requirement of precision of input data necessitates a plurality of iteration steps.

Figure 1:
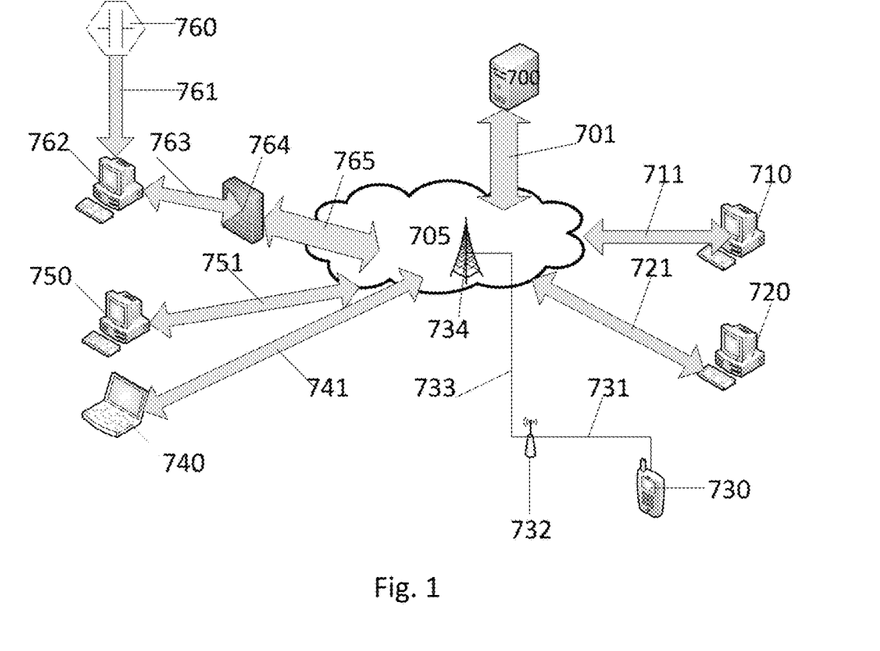
FIG. 1 shows an exemplary mathematical model implemented at a server and a simplified depiction of communication channels from downhole transmitters to the server and between the server and other computers.

It is to be understood that the communication and data processing system 600 comprises a system that extends from downhole transmitters, via data processing units, to system users. The communication and data processing system includes at least one mathematical model, which mathematical model may receive various manipulated parameters as input and produce output functions useable for increasing the efficiency of project works. The manipulated parameters are a mix of real-time data from downhole transmitters, among other sources, and other data impacting the execution of a project. The mathematical model(s) could be implemented as applications locally on a computer 700, 750, downloadable from an external server, or as a user interface presented to the system supplier of the communication and data processing system implemented as a pure interface application, while the project control functionality may be implemented as an external application. As an alternative, the communication and data processing system can be accessed via a web gateway through a web interface. The mathematical model(s) is/are implemented on a server 700 or a first computer 750 being external to three presentation machines 710, 720, 730. The three presentation machines 710, 720, 730 may receive a function parameter Hi(T) in the form of a curve informing the system user of the presentation machine on how the system user performs in a project, that is, if the system user is ahead of or behind a schedule. The number of presentation machines can be much higher than three, and it is to be understood that the service providers are only given access to data from the first computer that is customized for each individual service provider. In practice, this means that employers may have access to all data relevant for a project. For an exemplary solution in which a web interface is used, reference is made to FIG. 1. In FIG. 1 it is shown that well data is collected from a downhole transmitter 760. This, however, is a simplification as such well data, LWD, MWD, may originate from several transmitters. Moreover, well data may be communicated by wire, wirelessly, by telemetry, or combinations thereof. Well data is forwarded to a server 700. Server 700 may be external to the computer 740 of the system supplier—and will normally be external to the computers of the system users. Before the mathematical model is implemented for a project, system suppliers with knowledge of the model will enter relevant data related to historical data for similar projects, collected data from the current project, as well as other available information that may affect a project. The users entering data, administrators, enter data through computers 740 and/or 750. Data is communicated to the mathematical model at server 700. As indicated, employers and service providers may obtain access to output functions from the mathematical model 700 by logging on to a Web gateway through a computer 710, 720, or 730, for example.

Figure 2:
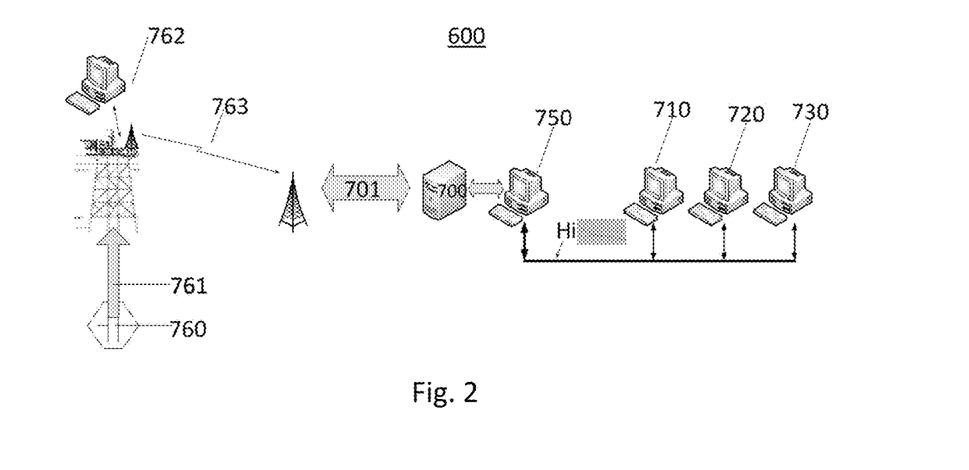
FIG. 2 shows an exemplary communication and data processing system comprising downhole transmitters and a mathematical model at a hub (700)

FIG. 2 shows another variant of a communication and data processing system 600 according to the present invention. System 600 comprises a drilling rig having a downlink communication channel 761 to one or more downhole transmitters 761. The downhole transmitters collect formation parameters, resistivity, progress, and the like, referred to as LWD and/or MWD data or as real-time data. Data is communicated via said communication channel 761 to one or more server/computers 762 on the drilling rig. Data from the downhole transmitters are sent raw or quality-assured towards a hub 700, 750. To communicate data, typically protocol standards such as WITSML or PRODML are used. Data may be transferred from the drilling rig wirelessly or by wire, or by way of some combination of wired and wireless methods to provide redundancy to the hub 700, 750. Data is received by a server 750 at the hub, which also stores data and provides for backup storage of data. A computer 750 at the hub includes a mathematical model that is specially modelled for each individual project. The mathematical model may also be located externally to computer 750 and a system supplier can retrieve the mathematical model by logging on to and/or launching an application on computer 750. Alternatively, computer 750 may be used as an "Internet computer" from which the system supplier logs on to a web site/server on which the mathematical model is stored and on which the application processing input and output data of the mathematical model may also be stored.

The system supplier makes sure the mathematical model is regularly updated with fresh data that affects the progress of a drilling project and indicates the progress of a drilling project. As indicated above, some of the data applied to the mathematical model will be entered automatically, which is typically the case for, but not limited to, LWD and MWD data.

The output function of the mathematical model Hi is directly correlated with the progress of a project. System users may log on to first computers 710, 720, or 730. When logged on, they may start an application locally or access an external site to read a progress curve correlated with Hi and customized for each individual system user. In a variant of the system, data from computer 750 may push updated output functions Hi to one or more relevant first computers so that these are informed on updates.

As indicated in the introduction, there is a potential for increasing the productivity of project works. Thus, as mentioned, according to the present invention, a communication and data processing system as well as a method for using this system for optimizing work during oil drilling are provided.

The scope of a project distributed between two or more parties, according to the prior art, will be static, even though it may include systems that give bonuses for work that has been performed quicker and with a better result than an expected value, and in which correspondingly fines and daily penalties can be given if a work is delayed or otherwise is not performed according to a contract. However, such contracts do not take into account neither real-time/log data nor actual changes that arise during the project.

The present invention provides an arrangement for an adaptive/dynamic communication and data processing system, in which a model-controlled part of a project value is used for controlling projects, that is, this part of a project value is changed throughout the project, with the changes being based on true data acquired from operations and previous project work.

Figure 3:
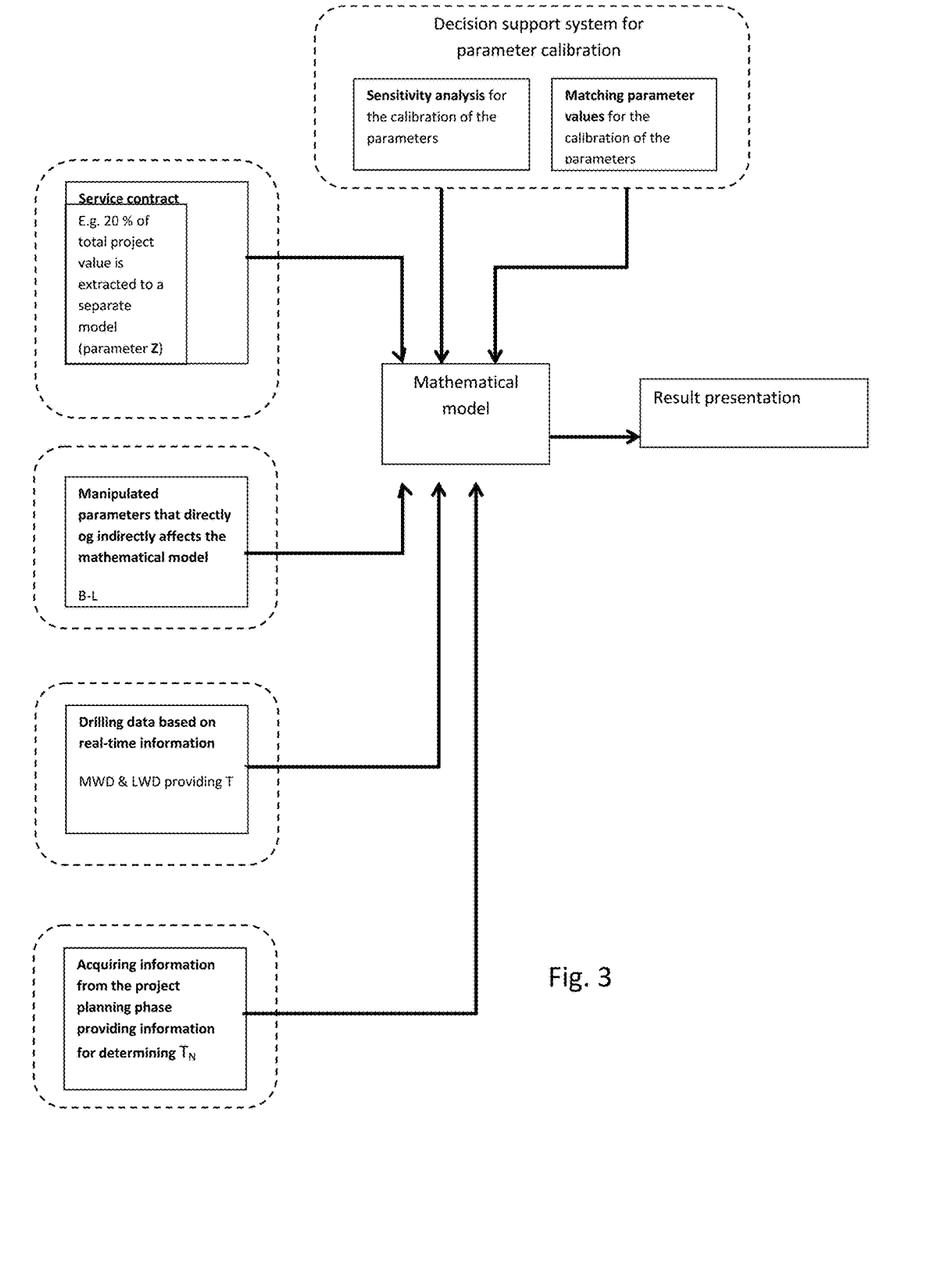
FIG. 3 shows a block diagram of a communication and data processing system comprising a mathematical model.

According to an embodiment of the invention, a part of a total project value can be extracted, see FIG. 3, to which part an application for adaptive adjustment is applied, while the remaining part of the project value is processed with no adjustment thereof to input parameters in accordance with real-time data or substantially real-time data, which is how it is done today. In FIG. 3 input parameters of a mathematical model are shown, one of which appears as a percentage of the project value, herein exemplified by 20%. This input parameter is denoted Z. As mentioned, in this case Z is 20%, but in principle, this parameter may take on any value between 0 and 100%, with 0% meaning that a mathematical model according to the present invention is not used.

The project flow itself, including designing the mathematical model, is disclosed in the following.

Dynamic Mathematical Model Characteristics

A dynamic mathematical model has been developed that facilitates project control. In this model, said percentage value (shown in FIG. 3 as the parameter Z) is extracted from a total/original project value and this percentage value is used as input to a dynamic application comprising a mathematical model. As output, the dynamic mathematical model provides output functions which are functions of the actually spent project/drilling time correlated with negative or positive bonuses. Hence, the output function will urge system users to increase their effort, that is, increase the progression as a positive bonus will serve as an incentive. In static models, fixed mount bonuses and fines are used. Thus, employers and service providers will not be given an incentive for increasing the efficiency in the same manner as in the dynamic application according to the present invention, as increased benefit for one part might imply the opposite for another party. The dynamic application according to the present invention produces output functions that may be visualized on external presentation machines 710, 720, 730. As mentioned above, the dynamic model is implemented as an application. The strength of the parameters of the application is recalibrated (increases/decreases) as the project delivers better/less than the project schedule; hence adaptivity is provided. The application is event driven. For example, in case of a strong negative deviation from the drilling schedule, it may be advantageous to recalibrate some of the parameters. This is because the change is of such a nature that the existing parameter value is not optimal given the situational change. It can be envisioned that in such a situation, optimal, i.e. recalibrated, parameter values provide better incentives as a motivation to perform better and "take back the lost time" (drilling quality and HMS are examples of other measurement parameters that could be used). Similarly, if a project performs better than expected, it may be optimal to recalibrate some of the parameters, given the situational change, in order to maintain the good position over time. Recalibrating the parameters does not necessarily require big changes. Analyses in the form of sensitivity analyses and historical matching of parameters may be run continuously so that the parameters can be changed to be optimal at any time throughout an entire project. This will, in turn, lead to a desired change in behaviour of the system users involved, e.g. incite increased productivity and cost efficiency in case of negative deviation from the drilling schedule as such negative deviation will result in a fine (or lower payment) which may cause an exponential reduction of fees/daily rate. Conversely, a positive deviation may result in an exponentially increasing bonus, in that the daily rate increases throughout the project. In this manner, a desired behaviour is promoted through stimulatory measures in order to achieve the common goals. The application presents an estimate of the increase/decrease of incentives associated with the progress of a project in real-time both on an organizational level and, if desirable, also on an employer level.

As input parameters to the application are used goals of the project/project schedule (target parameters), parameters related to incentives (i.e. the parameters that directly and indirectly affect the incentive calculations/input parameters B-L) and actual progression of the project being updated in real-time throughout the project (e.g. MWD and LWD parameters). A set of mathematical functions composed by the parameters and adapted to oil and gas drilling projects and the challenges they are facing, which combines to form an algorithm, will distribute a part of the incentives dynamically, that is, if the project during execution performs poorer than the baseline, then the daily rate/payment to the system users involved becomes lower than expected. In the opposite case, if the project performs better than expected, then the daily rate to the system users involved becomes higher than expected. If the project deviates negatively relative to the baseline, then there will be an incentive for all parties involved to make an extra effort to increase the productivity/quality. If the progress of the project is better than the baseline, then they will strive to maintain the position or strengthen the position. As the progress is updated and communicated in real-time, changes by the system users will occur rapidly because it is an incentive for all system users to increase the productivity/quality, and not only for the operator company, which is often the case today. The system users strive to increase the common incentives by reducing costs associated with "friction" arising between the system users because the system users protect their own portfolio having no focus on value creation for the total value chain of the project. Some of the profit from the reduction of these costs is distributed to the system users involved according to effort as measured by volume and quality (increased productivity/reduced time). The main goal of the application is to have the parties involved work towards a common target, as well as to quickly and efficiently respond to changes in the project by relating productivity and cost efficiency to incentives that are dynamic (i.e. are updated following changes in the progress of the project). In view of this, the application will contribute to create a desired behaviour among the organizations involved that benefits all system users, and have all parties work towards the same goal.

Changes in the expected outcome of incentives are updated in real-time throughout the entire project based on actual project changes and are communicated to all system users involved in real-time (e.g. on the web).

Decision Support System for Calibrating Parameters

Figure 5:
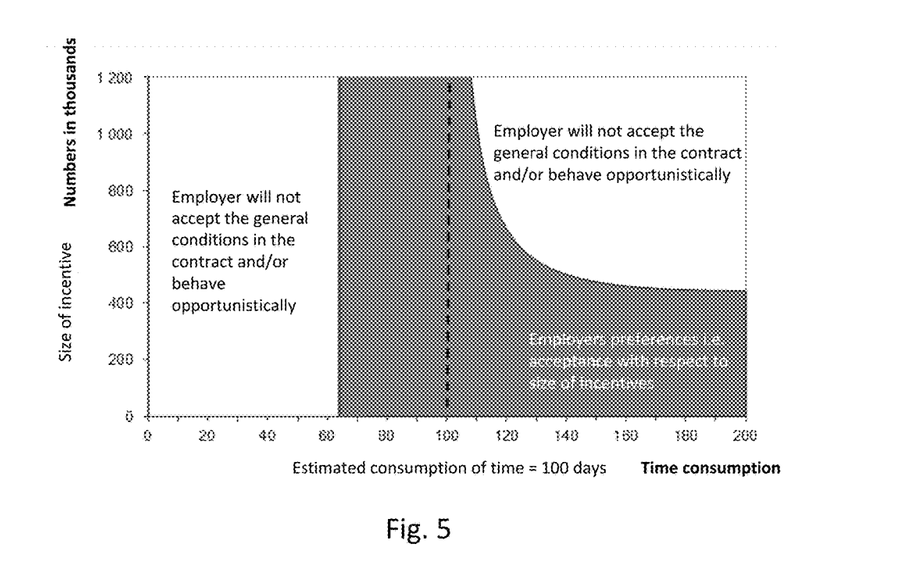
FIG. 5 shows a graphical example of what an employer will offer a service provider.

Sensitivity analysis of the parameters that directly and indirectly affect the incentive calculations is carried out in order to find the preferences of the system users (employers and service providers) with respect to each individual parameter. The parameters are described in more detail in a subsequent example. Therefore, sensitivity analysis is carried out for each individual parameter. The sensitivity analyses are used for calibrating the parameters at the beginning of the project and during execution of the project. New analyses are continuously performed throughout the entire drilling project in order to capture all changes that affect the progress, to allow the parameters to be recalibrated for optimal operation. Sensitivity analyses provide upper and lower limits for the value of each individual parameter. In FIG. 5, the upper limit of payout from the employer is depicted, while in FIG. 6, the lower acceptable limit for incentives of the service provider can be seen. The area between the upper limit of the employer and the lower limit of the service provider is the range of the parameter value given the particular project characteristics existing at this exact point in time. As mentioned, these parameter values change symmetrically with changes in project characteristics. As the functions composed in the sensitivity analyses are constructed on the basis of the other relevant parameters used as input to the application, changes in these parameters will also affect the preference to the parameter in question.

Matching of Parameter Values

Matching of parameter values is used for calibrating the parameters on the first calibration of incentives of a project, and not during project execution when parameters of a project are updated. Parameter values are set for a current project based on historical projects, if there are clear similarities between the projects. The project exhibiting the clearest similarities based on selected score parameters related to the characteristics of the drilling project will be the most relevant benchmark project. Typically, the characteristics are MWD and LWD data such as drilling depth, drilling length, pressure, temperature, geology, etc. These are used as input together with sensitivity analysis and historical matching against earlier drilling projects when the parameters is to be calibrated during start-up of a project.

Manipulated Parameters:

A number of the following parameters are used in a mathematical model according to the present invention. However, it is not always desirable to use all the parameters listed. Moreover, historical data and historical experience might yield improved parameter values. The parameters are substituted into an expression for the mathematical model, cf. FIG. 4, block 7.0, and equation EQ. 1.

TABLE 1

| Parameter | Description |
|---|---|
| MWD | Measurement-While-Drilling |
| LWD | Logging-While-Drilling, i.e. downhole parameters, such as formation data, resistivity, rate of penetration, drilling angle, etc. |
| $T_N$ | Estimated time to complete the project (total drilling time), $T_N$, is determined based on the expected completion time of the system users, generally based on historical data for similar projects. |
| T | Actual time to complete the project (total drilling time). |
| B | Time dependent exogenous parameter that the service providers cannot influence. In general, B will be represented in units of 24 hours, and B will be an integer greater than 0. The parameter is set by the system users, and may, to a certain extent, be based on historical experiences. These are disturbances which the system users are not able to control, such as weather conditions and the like, but also information such as availability of know-how, transport delays and passenger transport delays can be included in B provided that they are factors that cannot be controlled. However, if a delay of a piece of equipment is caused, for example, by usage on another rig requiring more time than planned for, then it is not a parameter B (rather a parameter F). The reason is that in this case a responsibility distribution can be assigned (which is not possible for a parameter B) |
| C | The variable income of the service provider (takes effect if the actual progress of the project is better than the estimated progress at the current point in the drilling project.) The parameter is set by the system users. To facilitate the establishment of the parameter, sensitivity analysis and matching of the parameter against the calibration of parameter C from previous drilling projects with similar characteristics can be used. C > 0 and is a monetary quantity. |
| D | Intensity of incentive. Weighting for E, F, B, G, I. These are integers greater than 0 that control the impact of the parameters. |
| E | The influence by the service provider on the project value when they are not directly involved in the project. Service providers may influence projects positively and negatively even if they are not directly involved in the project. This may be, for example, service providers affecting the project while awaiting execution of their own tasks. This parameter is similar to F, but may also be positive (F is always negative for the project), and, also, E focuses only on the impact from the service provider and not on other factors that may affect the project. E represents time impact, typically in units of 24 hours, and E can be greater or less than zero. |
| F | Time dependent exogenous parameter controllable by the service providers. In general, F is represented in units of 24 hours and F will be an integer greater than or equal to zero, with a value greater than zero indicating a delay of the project. The parameter represents the effort by the service provider that affects project value. The rate is set by the system users, and, to a certain extent, may be based on historical experiences. These are disturbances that the system users can influence, e.g. that drilling tools are used by another rig that causes delays. |
| G | The observable direct impact of the service provider on the project value. The value of the parameter G may be based on historical parameter matching and it will thus be increasingly accurate as a mathematical model according to the present invention is put into use. As compared to E, F, and B, G is observable and is directed to direct effort which the service providers are able to influence (not indirect effort). In general, G is represented in units of 24 hours, and G may be positive or negative. A negative value of G will be positive for the project. |
| $H_i(T)$ | $H_i$ designates the output function for the mathematical model in response to the manipulated parameters used for the mathematical model. |
| I | Weighting factor for G. I is set by the system users, and will indicate the impact of the parameter G, i.e. the value of G is dependent on the value (expression) for the weighting factor I. I is a dimensionless real-number exponent. |
| J | The variable income of the service provider. Risk parameter (takes effect if the actual progress of the project is slower than the estimated progress at the current time in the drilling project $T > T_N$). The parameter is set by the system users, supported by sensitivity analysis and parameter matching. J is a monetary quantity. |
| K | Scales J (takes effect if the actual progress of the project is slower than the estimated progress at the current time in the drilling project), cf. EQ.1. K is a dimensionless real-number exponent. |
| L | Scales C (takes effect if the actual progress of the project exceeds the estimated progress at the current time in the drilling project), cf. EQ.1. L is a dimensionless real-number exponent greater than 1. |
| Z | A percentage of the original project value, e.g. 20% of the current value of the service project value (taken from the existing service project value, see FIGS. 3 and 4). A dimensionless quantity indicating the chosen percentage of the total project value. |

Figure 4:
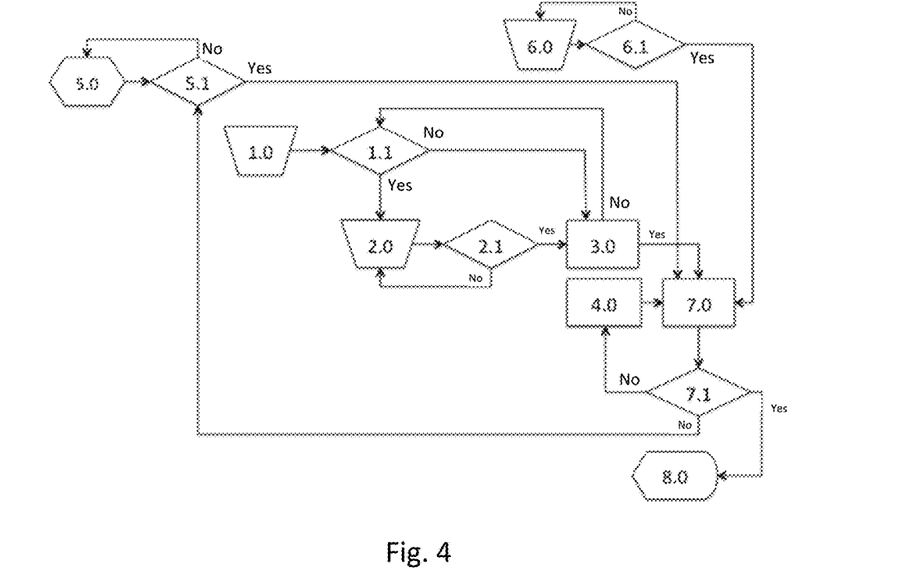
FIG. 4 shows a flow/state diagram of a communication and data processing system comprising a mathematical model and a presentation step.

According to an embodiment of the invention as illustrated in FIG. 4, showing a flow chart, an application for the adaptive adjustment of a project value may comprise several decision loops. An example of such adaptive adjustment is provided below with reference to the flow chart shown in FIG. 4.

Step 1.0 Defining the First Input Parameters:

In step 1.0, parts of the input parameters are defined before a project is initiated. That is, the percentage selected to be controlled by the model, Z, is not static but may be changed by changing the agreed parameters. The first input parameters relate to parameters associated with time usage, $T_N$, of the project and parameters associated with the incentives to be used for distributing bonuses and fines, shown as input parameters B-L. In blocks 3.0 and 4.0 of the flow chart, the exact magnitudes of such extracted first parameter values are determined.

Step 1.1 Magnitude Ok?

In step 1.1 it is evaluated whether the magnitudes of the first input parameters extracted in 1.0 are proper through negotiation between the system users, possibly assisted by a third-party system user. If the system users do not agree on the magnitudes of the parameters, the parameters will be further processed in the following step 3.0, in which a comparison with historical comparable data is made. As input parameters to step 1.1 are fetched not only input data from the previous step 1.0 (first input parameters), but also data from step 3.0 (third input parameters) as a feedback loop.

Step 2.0 Parameter Check:

In step 2.0, a check is performed to ascertain the extent to which the second input parameters are proper in consideration of the characteristics of the current project. The characteristics can be obtained via seismic surveys and exploratory drilling and may include formation properties such as density, porosity, resistivity, downhole pressure, temperature, and the like. The estimated time for completion is also important, e.g. what needs to be done and which challenges (e.g. geology, formation pressure, temperature, etc.) are faced. The second input parameters correspond to the output parameters from the previous step 1.1, which in turn represents the first input parameters or some combination of the first and third input parameters. This is performed manually. The parameters of this process are parameters that directly and indirectly affect the incentive calculations (described below). These parameters may be the same for all projects of a similar type (they are part of the application). The input parameters to step 2.0 are data from 1.1 (second input parameters) and data from 2.1 which are not proper according to the criteria of step 2.1.

Step 2.1 Parameters Proper?

In step 2.1, it is evaluated whether the parameters from 2.0 (fourth input parameters) are proper. This is performed based on the results from block 2.0. If the parameters are proper, they will be used in step 3.0 for matching data. If the parameters are not representative for the characteristics of the project, then they will be fed back to step 2.0 for repetition of this step for further calibration in order to find optimal parameters.

Step 3.0 Data Matching:

In step 3.0, calibrations of parameters from projects executed in the past are found. The best matching ones are used as a starting point for calibrating the parameters. As indicated above, step 3.0 is also used primarily for finding magnitudes for input parameters. Data from this step is stored and subsequently used for generating any desired reports. Reports can also be generated on which teams and businesses exhibit the best response to incentives and deliver the best results in different situations during a drilling project. Matched data is used as part of a set of fifth input parameters for running the mathematical model in step 7.0. Input data to step 3.0 is obtained from step 1.1 (first input parameters) and step 2.1 (fourth input parameters), whereas output data (third input parameters) from step 3.0 is provided to step 1.1 and, of course, as mentioned, to step 7.0.

Step 4.0 Sensitivity Analysis:

In step 4.0, a sensitivity analysis is performed based on the preferences of the system users (employer and service providers) in order to further calibrate the parameters (described below). The outcome of the sensitivity analysis provides an upper limit for what the employer is willing to pay the service provider (see FIG. 5, in which the employer e.g. on day 140 is willing to pay a maximum of about 580,000 NOK to the service provider). Likewise, the sensitivity analysis will provide an indication of the lower limit for the amount the service provider is willing to accept as payment from the employer (in FIG. 6, it can be seen that the service provider on day 140, for example, must be paid a minimum of 180,000 NOK to be satisfied.) Hence, payment must be between 580,000 NOK (upper limit) and 180,000 NOK (lower limit). If these limit values are exceeded, then either the employer or the service provider will not accept the offer or act opportunistically in the project (optimize its own portfolio, adversely affecting the project). As the drilling project progresses, it can be seen that the graphs of FIGS. 5 and 6 will change. It is understood that the upper and lower limit values will change symmetrically following changes in the project/dynamic change. This occurs in that some of the parameters are changed, or that the progress of the project changes. This implies that the sensitivity of the result variables is analyzed based on changes in parameter values, that is, the factors involved in the result of the mathematical model. Sensitivity analysis will be performed on all variables (parameter level) in addition to the overall outcome of incentives (cf. FIGS. 5 and 6). Input data of the sensitivity analysis results because the outcome of running the mathematical model in step 7.1 is not satisfactory (sixth input parameters). The result from the sensitivity analysis is used as part of a set of input parameters (seventh input parameters) for running the mathematical model in step 7.0.

Step 5.0 Extract Project Value:

In step 5.0, the system users, possibly with a system supplier present, agree on how much of a project value is to be extracted and subject to a model-controlled "project value." This is performed manually. As mentioned, the percentage of the project value being extracted is a matter of negotiation, but as the application according to the invention provides a more realistic picture of a work process, it will generally be profitable for the system users to extract a substantial portion, generally 20% or more. Typically, the percentage will be influenced by uncertainty on the performance of a job. The percentage extracted will be used as an input parameter to the application and, following adaptation, as a manipulated parameter of the mathematical model, and form the basis for dynamic output functions Hi(T) of the project. Naturally, the percentage of the total project value extracted can be both greater or less than 20%. Output data from step 5.0 is provided to step 5.1.

Step 5.1 Parameter Magnitude Proper?

In step 5.1, it is evaluated whether the parameter magnitude is proper. This is performed based on the results from block 5.0. The establishment of a proper parameter size determined by the employer and service provider. If the parameter magnitude is proper, then the parameter will be used as a manipulated parameter in a mathematical model 7.0, otherwise, if the magnitude of the parameter is not proper, then the result is used as input to a reiterated definition of parameters in step 5.0. Input data (sixth input parameters) to step 5.0 is also taken from step 7.1.

Step 6.0 Acquiring MWD and LWD Parameters.

The application acquires data originating from downhole transmitters 760, which data is obtained from server 700, or is provided to the application automatically by push messages. Server 700, in turn, has received the downhole data either by way of push messages from the sending computer (in reality, one or more service providers) 762 or by active download from the sending computer 762. In other words, the step comprises acquiring real-time information or substantially real-time information on actual progress of the project, with at least one of the parameters representing real-time measurements from the project work. It is important to adjust the parameters with regard to the service providers involved in the project work as the different service providers may present data in different manners. Typically, the data obtained at server 700 will originate from one or more service providers. For simplicity, is this illustrated as a service provider represented on a drilling rig. In reality, several service providers may receive real-time data from the drilling rig at their own central servers, which data may be different for each service provider. For the transfer of data, typically the protocols WITSML and PRODML are used. The downhole parameters are measured values that cannot be altered beyond any measurement uncertainty thereof. This is drilling data updated in real-time throughout the project that forms a basis for displaying progression and whether or not the project is in accordance with the drilling schedule. Output data (eight input parameter) from step 6.0 is provided to step 6.1.

Step 6.1 Proper Real-Time Parameters Acquired from MWD and LWD?

Evaluates whether the parameters acquired from MWD and LWD will give an adequate picture of the progress of the project. In step 6.1 it is evaluated whether the parameters are proper, based on the results from block 6.0. If the parameters are proper, they will be used as manipulated parameters (eight input parameters) for the mathematical model 7.0, otherwise, if the parameters are not proper, the result is used as input for redefining the parameters in step 6.0.

Step 7.0 Run Mathematical Model:

In step 7.0, the mathematical model is run to see if the manipulated parameters of the mathematical model are proper. According to an aspect of the invention, output parameters from steps 3.0, 4.0, 5.1, and 6.1 are used as manipulated parameters. The mathematical model itself is represented by a mathematical expression, of which an example is found in EQ1 in the following. The output function (sixth input parameters) from step 7.0 is provided to step 7.1.

Step 7.1 Simulation Based on the Given Manipulated Parameters Proper?

In step 7.1, it is evaluated whether the output function from the mathematical model in 7.0 is proper, i.e. satisfactory in regard to the preferences of the system users. If proper, the output function Hi(T) will be provided to the presentation computers 710, 720, 730 shown in the drawing as a final presentation step 8.0, or alternatively the system users must log on and load the most current output function adjusted to its purpose. If the output function is not satisfactory, then the relevant parameters will be returned to steps 4.0 and 5.1 for recalibration. Of course, this only applies to parameters regulating/affecting the output function of the mathematical model and the amount extracted from the total project value (5.0) (as these are parameters that may be changed). Obviously, drilling data, i.e. measurement data from downhole transmitters 761, will not be returned in a feedback loop as that data is not to be changed. If the output function of step 7.0 is not satisfactory, then the system users will identify parameters that should be recalibrated. Advantageously, a third party being completely independent of both the employer and service provider may participate in the quality evaluation of the result from step 7.0 and in the evaluation of which parameters should be recalibrated. The third party could be the system supplier.

Steps 8.0 Present Results.

In the final step, step 8.0, the output function Hi(T) is presented on one or more presentation computers. The output function may be presented graphically in the form of a graphical depiction or in the form of tables. As indicated above, the presentation may be a push variant or a variant in which the system users must themselves log on to their presentation computers and actively download output functions. As the project progresses, the expected output function will be similar to what planned for in the project (service provider is paid Z). The output function informs the service providers whether they are ahead of or behind a planned schedule and will also present a positive or negative bonus, depending on whether the service provider is ahead of or behind the schedule. Input data (sixth input parameters) to step 8.0 is obtained from step 7.1

Figure 7:
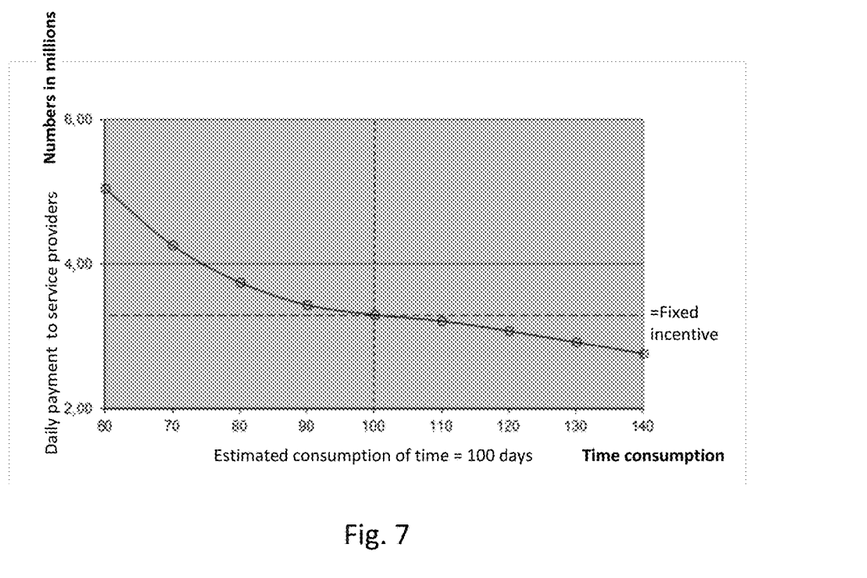
FIG. 7 shows an exemplary graphical depiction of a daily time bonus using a mathematical model, which time bonus may be negative or positive.
Figure 8:
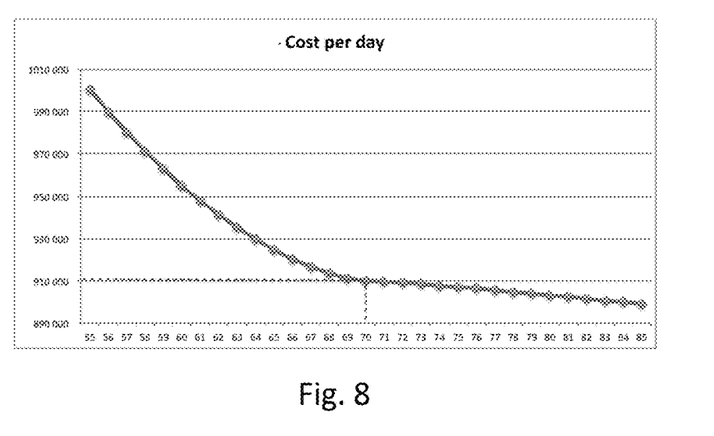
FIG. 8 shows cost per day for one service provider, wherein the stipulated time for the project is set to 70 days and the cost of 70 days is set to approximately 910,000.
Figure 9:
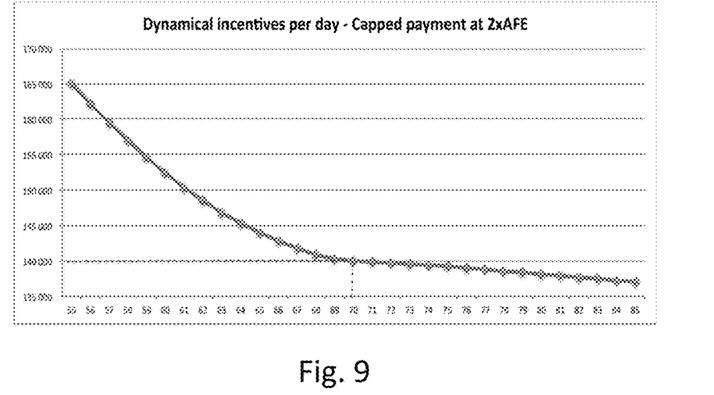
FIG. 9 shows dynamic bonus for a single first service provider; from the graph it can be seen that at the stipulated time, the bonus will be about 140,000, increasing for fewer days and decreasing slightly for more days.
Figure 10:
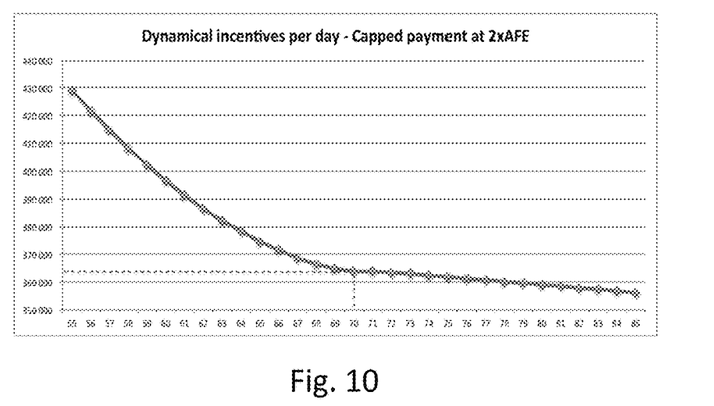
FIG. 10 shows dynamic bonus for a single, second service provider; in this case for a rig; from the graph it can be seen that at the stipulated time, the bonus will be about 364,000, and increasing for fewer days and decreasing slightly for more days.

Exemplary Use of the Mathematical Model According to an Embodiment of the Present Invention In the following, exemplary output functions for the service providers in a drilling project are provided. In FIG. 7 is represented a fixed daily payment from employer to service providers of NOK 3,300,000 (shown with a horizontal dashed line). From the drawing, it can be seen by the downward sloping solid curved graph (with circles) that on day 100 (i.e. the estimated time use for the project, $T_N$), the service providers will be paid NOK 3,300,000, that is, with no bonus included. The total payment to the service provider in this project will be (NOK 3,300,000×100) NOK 330,000,000 when the project is completed in exactly 100 days.

From the drawing it can be seen that if the service provider(s) uses/use more than 100 days, then he/they will have the daily rate reduced through the entire project. That is, the service provider(s) will receive less payment for each day a time limit is exceeded—a negative bonus. A reduced drilling time will result in a positive bonus that increases more strongly for each day. If the service provider(s) finishes/finish the project on day 90 and the target completion time for the project was set to 100 days, then the service provider(s) has/have over-performed and saved 10 days. Over-performance will result in a positive bonus, in this case a bonus corresponding to an increase of the daily rates for all project days from day 1 day 90, inclusive. If the daily rate when the project is completed on day 90 is 3,500,000 NOK, then the final payment to the service provider will be (NOK 3,500,000×90) NOK 315,000,000. Hence, the service provider has increased his daily rate with NOK 200,000 throughout the entire project, and the employer has reduced the total payment in the project (NOK 330,000,000-NOK 315,000,000) NOK 15,000,000. An expected resulting bonus in the form daily rate levels in the project for the different completion times for the project will be communicated to the service provider throughout project in order to ensure full predictability (For example, it may be communicated on day 53 of the drilling project that the project might be completed on day 90 for a project that is scheduled to be completed in 100 days). Thus, a predicted bonus can be communicated, as well as any changes occurring until completion of the project). The bonus/daily rate for the different completion times will change if one or more of the parameters of the model are changed.

The parameters derived from LWD/MWD provides real-time information on the actual time spent on the project, T. Deviations in the progress of the project may be revealed by comparing the actual drilling time, T, with the planned drilling time, $T_N$. The expression of EQ.1 providing an output function to the service provider may be as follows. This is also apparent from the flow chart of FIG. 4 and shown graphically in FIG. 7:

$$H_{in} = \begin{cases} H_C = (Z*T) + (((T_N - T) * \\ (D*((E+F+B) + (G*I))))^L) & \text{for } T < T_N \\ H = (Z*T) & \text{for } T = T_N \\ H_J = (Z*T) - (((T - T_N) * \\ (D*((E+F+B) + (G*I))))^K) & \text{for } T > T_N \end{cases} \quad \text{EQ. 1}$$

$H_i$, i.e. the output function of the mathematical model, corresponds to the output parameters of step 7.0 as described above with reference to FIG. 4. It should be noted that EQ. 1 is an exemplary mathematical model, and simpler or more complex models can be envisioned depending on the complexity of an assignment, predictability, as well as historical data from similar projects. Moreover, it is to be understood that the model may be applicable in other fields than the petroleum industry, typically applications within construction engineering, civil engineering works, and other fields in which project control is important for a sound execution of projects. It is understood that LWD and MWD are then replaced with relevant real-time parameters or substantially real-time parameters, and that other parameter adaptations will also be necessary. The realization on which the present invention is based, namely that in many cases system users work against an efficient project execution in consequence of a lack of compensation for efficient progression, may be extended to a wide range of operations outside the oil industry.

A detailed explanation of the parameters entering EQ.1 is found in table 1 above.

Changes in LWD/MWD, i.e. progression of the drilling project, will decide whether T is greater than, equal to, or less than $T_N$, and determine which of the $H_i$ expressions applies, namely $H_C$, $(T<T_N)$, $H_J$, $(T>T_N)$ or H, $(T=T_N)$. Parameter calibration will also affect the magnitude of the output function, which parameters will be discussed in more detail in the following. The output functions are indications of rewards and are changed in accordance with a model as a function of time, T. Calibrating D, E, B, F, G, I, L, K, for example, will also affect the output function. These parameters can be decided by the system users (employer and service provider).

In an example according to an aspect of the invention, a design group has made a forecast of what is to be carried out and in which time (completion time). If a well that, in this example, is scheduled to be drilled in 100 days, then $T_N$=100. Hence, $T_N$ is fixed. The parameters set by the system users are the parameters controlling the correlation between deviations and negative or positive bonus (e.g. the combination D, E, B, F, G, I, L, K). LWD and/or MWD parameters are a function of time T. This is real-time data or substantially real-time data and used as a basis for ascertaining whether or not the progress of the project is according to schedule, $T_N$. A point with the model is that the output function, $H_i$, for the mathematical model can be affected by whether or not the execution is ahead of or behind $T_N$. An optimized calibration of D, E, B, F, G, I, L, K, for example, throughout a project will help providing a sound mathematical model in which changes in the project are accounted for. The calibration of these parameters (D, E, B, F, G, I, L, K) can be accomplished by sensitivity analysis to find preferences of the employer and service provider, i.e. upper and lower parameter value limits. Matching with earlier projects may be performed, which will make sure the mathematical model is continuously improved as historical data is added. By visualizing an output function and being able to recalibrate the parameters as the project changes, it will be possible to catch the interest of the system users and hence get the service provider(s) involved to work towards increasing the value of the project instead of optimizing their own portfolio because that is more profitable. The reason is that the model is calibrated in such a manner that the interests/preferences of the system users are ensured, as assisted by means of the sensitivity analyses.

Figure 6:
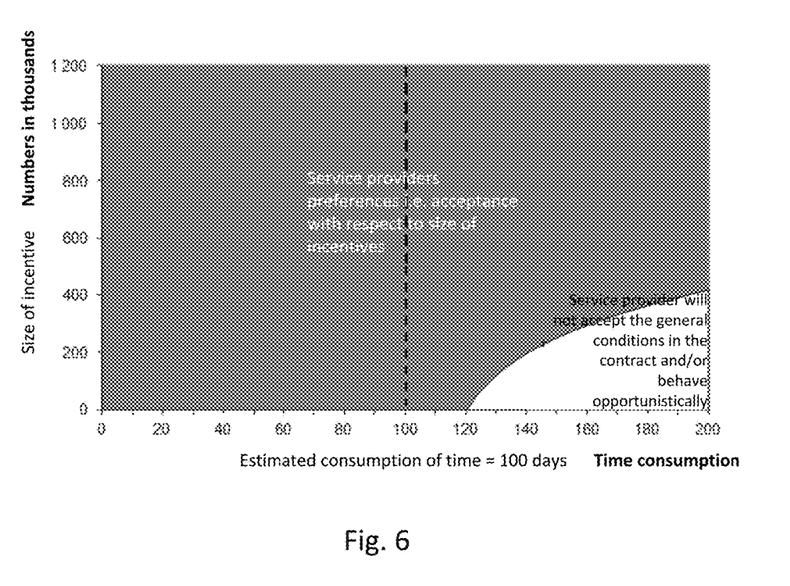
FIG. 6 shows a graphical example of what a service provider is willing to accept as payment from an employer.

The model parameters may be recalibrated so that the bonus—positive or negative—increases or decreases. The preferences of participating system users may form the basis for the parameter recalibration. This is illustrated in FIGS. 5 and 6. For example, in FIG. 5, we have used a function that is put into effect when $(T>T_N)$. In this case, on day 140, for example, we can read from FIG. 5, the preferences of the employers, that they are willing to pay a maximum of 480,000 NOK to a particular service provider. In FIG. 6, we can read that the service provider will accept a minimum of 230,000 NOK in case the project is completed on day 140. If the service provider demands higher incentives or the employers demand lower incentives, then the system users either will not accept the terms or will optimize their own portfolio in the project at the expense of the overall value added by the project.

It should be noted that the functions used in the above example applies for $(T>T_N)$. If $T<T_N$, then $H_i=H_C$, while if $T=T_N$, then $H_i=H$. The functions are represented in EQ.1, and an exemplary graph formed is shown in FIG. 7.

Deviations from the estimated time $T_N$ may be read from FIG. 7, in which payment according to $T_N$ is represented by the dashed line and yields a fixed incentive (horizontal axis at approximately 3.5 mill., wherein T is a function of LWD and/or MWD). The vertical dashed line representing the estimated time use indicates $T_N$, i.e. the number of days estimated for completing a project (vertical dashed line at day 100). The solid curved line represents $H_i$, i.e. the output function of the mathematical model. In the example, a deviation can be observed between $T_N$ and $H_i$ (because $T \neq T_N$). The solid horizontal curve at 4.00 on the vertical axis is only provided to facilitate the reading of the table and hence doesn't represent any particular quantity correlated with $H_i$. This deviation in %/monetary value will help establishing an estimate of the total incentives, provided actual calibration of the remaining parameters. It is also possible to use a regular Gant chart and show the deviation in %/monetary value relative to the planned project progression. The outcome would be the same. It is also possible to recalibrate the parameters to obtain a more optimal parameter combination if the project exhibits a large deviation relative to $T_N$, and a recalibration given the magnitude of the deviation and the project characteristics favours a recalibration. Recalibration may also be performed in response to a request from one of the system users (e.g. the employer) in order to accelerate the progression so that the project returns to a state in which it is in accordance with the project schedule or to an operational situation that is better than the project plan.

REFERENCE NUMBERS USED IN THE DRAWINGS

- 600 A communication and data processing system according to the present invention.
- 700 A server at which real-time data is stored and at which the application may be stored
- 701 Bidirectional communication line between network 705 and server 700, FIG. 1.
  Bidirectional communication line from an access point to server 700, FIG. 2
- 710 Service providers and employers having access to results from the mathematical model via a network 705 from a presentation computer 710, FIG. 1.
  Presentation computer for system users, FIG. 2
- 711 Communication line from a computer 710 at a service provider or employer to a network 705, FIG. 1
- 720 Service providers and employers having access to the output function from the mathematical model via a network 705 from a presentation computer 720, FIG. 1.
  Presentation computer for system users, FIG. 2.
- 721 Communication line from a presentation computer 720 at a service provider or employer to a network 705, FIG. 1.
- 730 Service providers and employers having access to the output function from the mathematical model via a network 705 from a smart phone 730, FIG. 1.
  Presentation computer for system users, FIG. 2.
- 731 Wireless connection 731 from a smart phone 730 to an access point 732, FIG. 1.
- 732 Access point for the wireless connection between a smart phone 730 and a radio access point 734. Several units may be connected to the access point provided they have a wireless interface compatible with access point 732, FIG. 1.
- 733 Wireless connection between access point 732 and a radio access point 734, FIG. 1.
- 734 Radio access point having a wireless connection to access point 732. Typically, the radio access point will have a connection to a number of mobile phones as well as base stations in a cellular network, FIG. 1.
- 740 Computer for accessing server 700 via intermediate communication lines. Computer 740 updates the mathematical model before start-up of a project based on known, historical, and expected project parameters, FIG. 1.
- 741 Communication line between a computer 740 and a network 705, FIG. 1.
- 750 Computer for accessing server 700 via intermediate communication lines. Computer 750 may update the mathematical model before start-up of a project, based on known, historical, and expected project parameters, FIG. 1.
  System supplier computer having access to server 700. Computer 750 may update the mathematical model before start-up of a project, FIG. 2.
- 751 Communication line between a computer 740 and a network 705, FIG. 1.
- 760 Downhole transmitters, detectors, producing MWD and LWD data.
- 761 Communication channel between downhole transmitters producing MWD and/or LWD data and one or more computers 762.
- 762 Computer receiving real-time drilling data (MWD, LWD, see 760) from communication line 761. Real-time data is forwarded to application (server) 700 via a network 705, FIG. 1.
  Computer receiving real-time drilling data (MWD, LWD, see 760) from communication line 761. Real-time data is forwarded to server 700 via network 763 and 701, FIG. 2.
- 763 Communication line between a computer 762 and an optional firewall 764. Such a firewall may be located between each computer (710, 720, 730, 740, 750) and network 705, FIG. 1.
  Communication line between a computer 762 and an access point, FIG. 2.
- 764 Optional firewall, FIG. 1.
- 765 Communication line between firewall 764 and network 705 for the communication of data between network 705 and computer 762, FIG. 1.

The invention claimed is:

1. A communication and data processing system for use between one or more employers and one or more system users and one or more system suppliers of the communication and data processing system, at least comprising:
   a) one or more downhole transmitters configured for providing LWD and/or MWD data,
   b) the downhole transmitters communicating via a communication line with one or more computers upstream of the communication line through a data protocol for the transfer of MD and/or MWD data,
   c) LWD and/or MWD data being stored locally at the one or more upstream computers,
   d) data being transferred locally from the drilling installation to a central hub, the transfer being accomplished by wire or wirelessly via radio transceivers located on the installation and in communication with the central hub,
   e) the central hub comprising a WITSML server
   f) one or more mathematical models on the WITSML server for calculating an output function $H_i(T)$, where $H_i(T)$ denotes a function for increasing plant time efficiency and T denotes the true time spent in a project, wherein calculating $H_i(T)$ at least includes using the following manipulated parameters:
   g) $T_N$: estimated time for completing the project,
      T: actual time for completing the project,
      Z: selected portion of total project value,
      and at least one parameter obtained from the one or more downhole transmitters,
   h) wherein, further, an application is implemented on the central hub, the application being configured for receiving parameters from the downhole transmitters comprising LWD and/or MWD data and other parameters relevant for the project, and the application being in direct communication with the mathematical model, or the application comprising the mathematical model,
   i) one or more first computers having direct access to the hub and the WITSML server, operated by said one or more system suppliers,
   j) one or more second presentation computers in communication with the one or more first computers, the second presentation computers at least receiving output functions $H_i(T)$ from the one or more first computers and the output functions $H_i(T)$ being selectively associated with individual second computers, and
   k) wherein one or more system users are associated with the second computers.

2. The communication and data processing system of claim 1, wherein the actual project time T is derived from real-time or substantially real-time well data.

3. The communication and data processing system of claim 1, wherein the actual project time T is derived from real-time or substantially real-time well data, the well data being based on LWD and/or MWD measurements.

4. The communication and data processing system of claim 1, wherein calculating $H_i(T)$ at least further comprises using the following manipulated parameters:
   B: rate for external disturbances,
   C: variable bonus of the one or more service providers, comes into effect if $T<T_N$,
   D: intensity of incentive,
   E: impact of the one or more service providers on the real value of Z when not directly involved,
   F: external disturbances/impact on the effort of the service provider that affects the real value of Z, G: observable impact of the one or more service providers on the real value of Z,
I: weighting of G,
J: risk parameter, taking effect if $T>T_N$,
K: scales J, for $T>T_N$, with K being correlated with the slope of $H_i$, and
L: scales C, for $T<T_N$, with L being correlated with the slope of $H_i$.

5. The communication and data processing system of claim 1, wherein the estimated project time $T_N$ is a quantity set by the at least two system users.

6. The communication and data processing system of claim 4, wherein the quantities D, E, B, F, G, I, L, K are set by the system users.

7. A method for administrating drilling projects, at least comprising the steps of:
   a) step a, comprising three separate sub-steps (i), (ii), and (iii); wherein sub-step (i) at least comprises defining first input parameters comprised of estimated drilling time $T_N$, sub-step (ii) at least comprises establishing a parameter Z, with Z being a chosen portion of the total project value, and sub-step (iii) at least comprises obtaining real-time data representing measurement of progress of the drilling project in real-time, comprising the steps of configuring one or more downhole transmitters to provide LWD and/or MWD data,
   b) communicating through a data protocol for transferring LWD and/or MWD data via a communication line to one or more computers upstream of the communication line, the downhole transmitters being located downstream of the communication line,
   c) storing LWD and/or MWD data locally at the one or more upstream computers,
   d) transferring data locally from the drilling installation to a central hub, the transferral being accomplished by wire or wirelessly via radio transceivers at the installation and in communication with the central hub,
   e) if the one or more first manipulated parameters are OK proceed to step f), else proceed to step e,
   f) manually checking the first input parameters,
   g) if the first input parameters are not OK proceed to step f) else proceed to step h),
   h) calibrating the first input parameters according to historical data,
   i) if parameter value Z is not OK proceed to step a),
   j) the parameter values for real-time data representing measurement of progress of the drilling project in real-time are not OK proceed to step a) and carry out sub-step (iii),
   k) running the mathematical model,
   l) if the output functions from the mathematical model are OK proceed to step n),
   m) entering the output functions from the mathematical model into a model for sensitivity analysis, entering the manipulated parameters from the sensitivity analysis into the mathematical model in k), proceeding to step a) and recalibrating Z,
   n) presenting results from running the mathematical model for a plurality of system users, and
   o) wherein steps b-n are carried out by an application on a computer.

8. A non-transitory computer-readable medium comprising software when executed by a computer, for carrying out the method according to claim 7.

9. The communication and data processing system of claim 2, wherein the actual project time T is derived from real-time or substantially real-time well data, the well data being based on LWD and/or MWD measurements.

10. The communication and data processing system of claim 2, wherein calculating $H_i(T)$ at least further comprises using the following manipulated parameters:
    B: rate for external disturbances,
    C: variable bonus of the one or more service providers, comes into effect if $T<T_N$,
    D: intensity of incentive,
    E: impact of the one or more service providers on the real value of Z when not directly involved,
    F: external disturbances/impact on the effort of the service provider that affects the real value of Z,
    G: observable impact of the one or more service providers on the real value of Z,
    I: weighting of G,
    J: risk parameter, taking effect if $T>T_N$,
    K: scales J, for $T>T_N$, with K being correlated with the slope of $H_i$, and
    L: scales C, for $T<T_N$, with L being correlated with the slope of $H_i$.

11. The communication and data processing system of claim 3, wherein calculating $H_i(T)$ at least further comprises using the following manipulated parameters:
    B: rate for external disturbances,
    C: variable bonus of the one or more service providers, comes into effect if $T<T_N$,
    D: intensity of incentive,
    E: impact of the one or more service providers on the real value of Z when not directly involved,
    F: external disturbances/impact on the effort of the service provider that affects the real value of Z,
    G: observable impact of the one or more service providers on the real value of Z,
    I: weighting of G,
    J: risk parameter, taking effect if $T>T_N$,
    K: scales J, for $T>T_N$, with K being correlated with the slope of $H_i$, and
    L: scales C, for $T<T_N$, with L being correlated with the slope of $H_i$.

12. The communication and data processing system of claim 9, wherein calculating $H_i(T)$ at least further comprises using the following manipulated parameters:
    B: rate for external disturbances,
    C: variable bonus of the one or more service providers, comes into effect if $T<T_N$,
    D: intensity of incentive,
    E: impact of the one or more service providers on the real value of Z when not directly involved,
    F: external disturbances/impact on the effort of the service provider that affects the real value of Z,
    G: observable impact of the one or more service providers on the real value of Z,
    I: weighting of G,
    J: risk parameter, taking effect if $T>T_N$,
    K: scales J, for $T>T_N$, with K being correlated with the slope of $H_i$, and
    L: scales C, for $T<T_N$, with L being correlated with the slope of $H_i$.

13. The communication and data processing system of claim 2, wherein the estimated project time $T_N$ is a quantity set by the at least two system users.

14. The communication and data processing system of claim 3, wherein the estimated project time $T_N$ is a quantity set by the at least two system users.

15. The communication and data processing system of claim 4, wherein the estimated project time $T_N$ is a quantity set by the at least two system users.

16. The communication and data processing system of claim 15, wherein the quantities D, E, B, F, U, I, L, K are set by the system users.

* * * * *

UNITED STATES PATENT AND TRADEMARK OFFICE
CERTIFICATE OF CORRECTION

Page 1 of 1

PATENT NO. : 10,113,416 B2
APPLICATION NO. : 15/106122
DATED : October 30, 2018
INVENTOR(S) : Knut Arne Sund It is certified that error appears in the above-identified patent and that said Letters Patent is hereby corrected as shown below:

In the Claims

At Column 18, Claim 1, Line 11, the word "MD" should read -- LWD --;

At Column 19, Claim 7, Line 46, "j)" should read -- j) if --; and

At Column 21, Claim 16, Line 5, the letter "U" should be replaced with -- G --.

Signed and Sealed this
Eighth Day of January, 2019

Andrei Iancu
*Director of the United States Patent and Trademark Office*